Feb. 4, 1936. W. H. KITTO Re. 19,844

SUCTION CLEANER

Original Filed Jan. 31, 1934

INVENTOR

William H. Kitto

BY

Harry S. Dwarez

ATTORNEY

Reissued Feb. 4, 1936 Re. 19,844

UNITED STATES PATENT OFFICE 19,844

SUCTION CLEANER

William H. Kitto, Canton, Ohio, assignor to The Hoover Company, North Canton, Ohio, a corporation of Ohio Original No. 2,003,085, dated May 28, 1935, Serial No. 709,063, January 31, 1934. Application for reissue December 19, 1935, Serial No. 55,283. In Great Britain January 5, 1934

8 Claims. (Cl. 240—2)

The present invention relates to suction cleaners in general and particularly to a new and improved suction cleaner construction embodying floor-lighting means. More specifically the invention comprises the provision of a suction cleaner construction in which the floor-lighting means are positioned and carried in a new and novel manner.

It is an object of the present invention to provide a new and improved suction cleaner construction. It is a further object to provide, in a suction cleaner, a new and improved construction embodying floor-lighting means. Still another object is the provision of combination motor and floor-lighting means in which the latter is positioned substantially within the confines of the cleaner motor and is removable as a unit with a part thereof. These and other more specific objects will appear upon reading the following specification and claims and upon considering in connection therewith the attached drawing to which they relate.

Referring now to the drawing in which the same reference character refers to like parts in the various views.

It has been discovered that the usefulness of a suction cleaner is materially increased by the provision of a floor-illuminating light carried by the cleaner. Such means should be so positioned relative to the machine that it directs light rays to the surface covering undergoing cleaning immediately forward thereof. The mounting of the headlight or floor-illuminator upon the machine must be such that the over-all height of the cleaner is not materially increased; and should preferably be so arranged that the light cannot be injured by contact with articles of furniture etc. In the suction cleaner constructed in accordance with the present invention the light has been mounted completely within the normal contour of the motor and is completely protected. This result has been obtained in a relatively simple and inexpensive manner yet one which produces a finished product which is highly desirable in appearance and functional operation.

Figure 1:
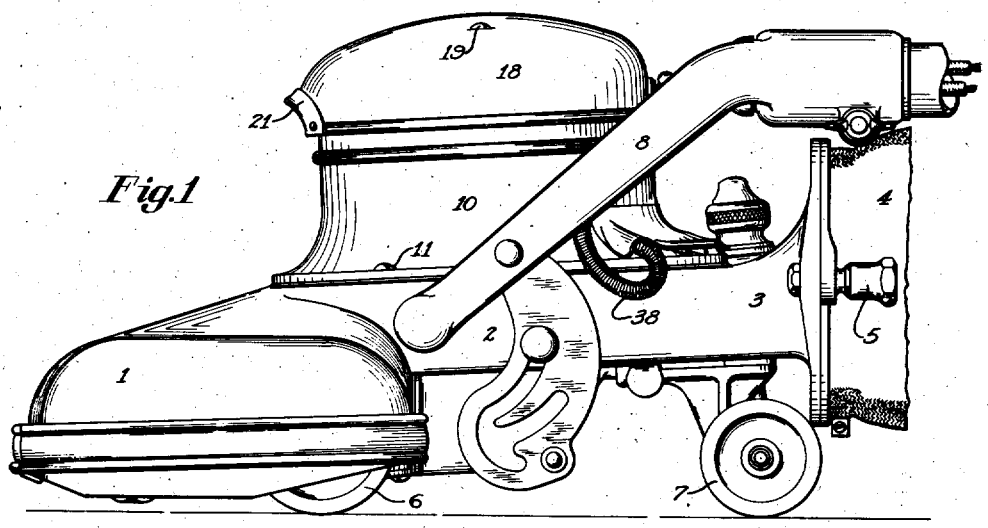
Figure 1 is a side view of a modern suction cleaner embodying floor-lighting means constructed in accordance with the present invention.
Figure 2:
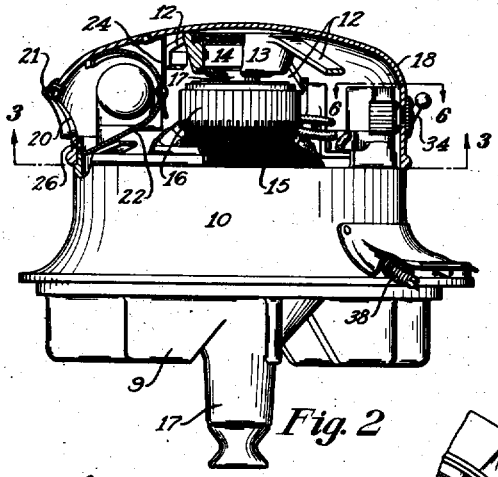
Figure 2 is a partial section through the cleaner motor showing the lighting means embodied therein.
Figure 4:
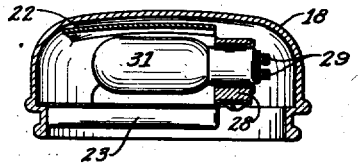
Figure 4 is a section upon the line 4—4 of Figure 3.
Figure 8:
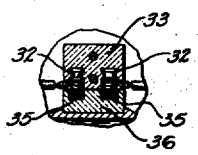
Figure 8 is a section upon the line 8—8 of Figure 7.

Referring again to the drawing and Figure 1 in particular, the reference character 1 indicates the cleaner nozzle, 2 the fan chamber and 3 the exhaust outlet. A dust bag 4 is removably secured by means 5 to the outlet 3, as in the usual cleaner construction. The parts 1, 2 and 3 form what is usually known as the main casing of the machine and may be made in a single casting or may be assembled, as desired. Front and rear supporting wheels 6 and 7 movably support the main casing while the provision of a pivot handle 8 makes possible the convenient manipulation of the machine by the operator.

Within the fan chamber 2 is rotatably mounted the suction-creating fan 9 which is carried by the lower end of the cleaner motor which is itself carried by the casing and positioned immediately above the fan chamber. The motor comprises a rigid frame, the lower portion 10 of which is cylindrical in shape and also serves as a part of the motor casing, it being secured to the top of the chamber 2 by screws, one of which is indicated by the reference character 11.

The motor frame above the cylindrical casing portion 10 comprises spaced arms 12, 12 which extend upwardly and then inwardly to form a bearing seat 13 within which is removably positioned a ball-bearing 14. The arm 12 at the front side of the motor extends inwardly immediately above the cylindrical casing portion until it closely approaches the armature 15 and its commutator 16. It then extends upwardly to the bearing seat 13. This arm provides, in effect, an outwardly facing shelf. The armature 15 of the motor, including its commutator 16, is rotatably mounted in the bearing 14 with the shaft 17 extended therein. The stationary field portions of the motor may be suitably mounted in or on the cylindrical portion 10 of the frame.

The casing of the motor is completed by a removable cap member 18 which seats on the portion 10 and is removably secured thereto by means of screws which extend through the top of the cap into certain of the arms 12 of the frame. One of these retaining screws is indicated in Figure 1 by the reference character 19. The forward portion of cap 18 is provided with an opening 20, the walls of the cap surround the opening extending to a slightly greater diameter than the remainder of the cap for purposes of appearance, there being provided a protective rubber guard member 21 which encircles the opening.

The light-creating means is removably mounted in the cap 18 immediately behind the opening 20. These means comprise a sheet metal frame 22, which is shaped as, and serves as, a reflector. The top of reflector 22 is adapted to contact the top of cap 18 while its lowermost portion, defined by a curved wall 23, is adapted to lie against the inner surface of cap 18 below opening 20. A leaf spring 24 is carried by the cap 18 and contacts the back of reflector 22 urging it toward the opening 20. An integral inner shoulder 25 on cap 18 limits the movement of the upper part of reflector 22 and the curved wall 23 contacting with the cap below the opening performs a similar function for the lower part thereof. Inwardly extending pins 26 on the cap cooperate with openings 27 in the portion 23 of reflector 22 and prevent unintended downward displacement of that member.

A lamp-carrying socket 28 of insulating material is carried at one end of reflector 22, and is provided with contacts 29, 29 to which current-carrying leads 30, 30 attach. The lamp bulb removably seats on the socket and is indicated by the reference character 31.

Figure 7:
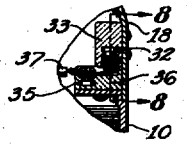
Figure 7 is a section upon the line 7—7 of Figure 6, and shows the separable contacts.

The leads 30, 30 extend from the bulb socket to contacts 32, 32 one of the leads first passing through a manually operable switch 34 carried by the cap 18. The contacts 32, 32 are carried by an insulating body 33 which is mounted upon the cap 18 and is removable therewith. When the cap is in place the contacts 32, 32 contact the cooperating contacts 35, 35 carried by an insulating body 36 upon the casing portion 10. Leads 37, 37, of which one is shown in Figure 7, connect the contacts 35, 35 to the electrical circuit of the motor, the motor itself being supplied with current by conductors carried by the conduit 38 which extends down the cleaner handle and enters the motor casing.

Figure 5:
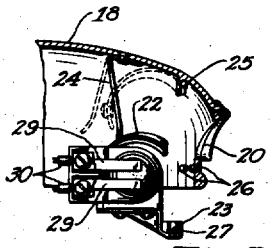
Figure 5 is a vertical section through the motor casing cap showing the lighting means partially removed.
Figure 3:
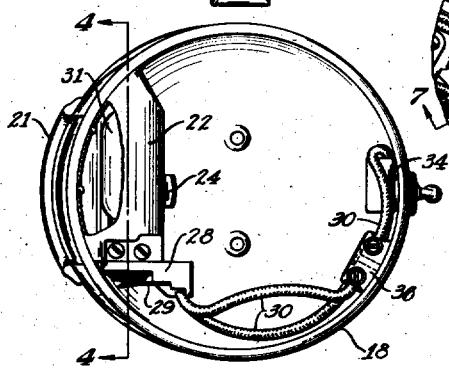
Figure 3 is a section upon the line 3—3 of Figure 2.
Figure 6:
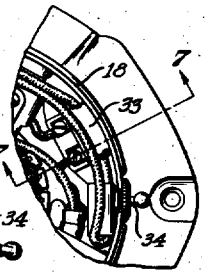
Figure 6 is a section upon the line 6—6 of Figure 2.

In the operation of the machine or cleaner in which the dirt finder constructed in accordance with the present invention is incorporated, the machine may be operated with or without the lighting means. If the operator desires the benefit of the light it is only necessary to close the manually operable switch 34 which thereupon throws the circuit of the lighting means into the electrical circuit of the motor. The exact electrical connection of the lighting circuit to the motor circuit is not of the essence of this invention. If for any reason the light fails, or if it is desired to obtain admission to the motor, it is only necessary to remove the casing portion 18, the lighting circuit and all of its connections coming away from the motor proper with the cap portion 18, the contacts 32, 32 and 35, 35 separating and breaking the circuit. With the cap 18 removed from the motor proper in order to remove the light from the cap it is only necessary to flex the spring 34 rearwardly to the dotted line position shown in Figure 5. The reflector 22 together with socket and bulb is then easily disengaged in an obvious manner after which the light can be removed from its socket. Replacing the lighting unit is precisely the reverse operation.

I claim:

1. In a suction cleaner, a motor including a casing portion, a frame portion extending rigidly at the side of said casing portion, an armature rotatably supported in said frame portion, a removable casing portion enclosing said frame portion and provided with an opening on one side, a light reflector, socket, and bulb carried by said removable casing portion adjacent said opening and within the normal periphery of said casing portion, and current-carrying means connecting said socket with a source of electric current.

2. In a suction cleaner, a motor including a rotatable armature having a reduced diameter at one of its ends, a frame supporting said armature, a casing enclosing said frame and armature and having an opening, a space being provided between said casing and the part of said armature of reduced diameter, a lighting unit mounted on said casing facing said opening and positioned in said space, and current-carrying means connecting said unit to a source of current.

3. In a suction cleaner, a vertical axis motor including a rotatable armature and a frame therefor, a portion of said frame extended inwardly toward the axis of armature rotation at one end of said armature, a casing member overlying said frame and provided with an opening facing the inwardly extended portion of said frame, a reflector mounted on said casing adjacent said opening, a light mounted at said reflector, said casing, reflector and light being removable as a unit from said frame.

4. The construction defined in claim 3 wherein said light is mounted on said reflector and is removable therefrom as a unit.

5. In a suction cleaner, a frame including a hollow cylindrical portion and arms extending from circumferentially spaced points on said cylindrical portion and converging at a central point at one end thereof, a bearing at said central portion, an armature rotatably mounted in said bearing and extended through said cylindrical portion, one of said arms being curved to extend toward the axis of rotation between said central point and said cylindrical portion to form an outwardly facing shelf, a removable casing enclosing said arms and having an opening adjacent said shelf, a lighting unit including reflector, socket and bulb carried in said casing adjacent said opening, and means connecting said light to a source of electric current.

6. In a suction cleaner motor, a rotatable armature including a commutator of smaller diameter than the central part of said armature and positioned at one end thereof, means rotatably supporting said armature including a bearing outside said commutator and a frame, said frame being formed to provide a recess adjacent said commutator, a casing member enclosing a part of said motor including said commutator and provided with an opening adjacent said recess, a light carried by said casing and positioned in said recess with said casing member in place, and current-conducting means connecting said light to a source of current.

7. The construction defined in claim 6 characterized by the fact that said current conducting means connect to contacts carried by said casing member which are adapted to contact suitable contacts mounted on said frame.

8. The construction defined in claim 6 characterized by the fact that a manually operable switch is carried by said casing member and is connected in the circuit of said light.

WILLIAM H. KITTO.